US009206995B2

(12) United States Patent
Nelson et al.

(10) Patent No.: US 9,206,995 B2
(45) Date of Patent: Dec. 8, 2015

(54) HYBRID ELECTRIC WATER HEATER WITH EXTERNAL DISCHARGE DUCTING

(75) Inventors: Jonathan D. Nelson, Louisville, KY (US); Michael Thomas Beyerle, Pewee Valley, KY (US); Jeffrey A. Kern, Louisville, KY (US); Eliel Fresco Rodriguez, Louisville, KY (US)

(73) Assignee: General Electric Company, Schenectady, NY (US)

( * ) Notice: Subject to any disclaimer, the term of this patent is extended or adjusted under 35 U.S.C. 154(b) by 473 days.

(21) Appl. No.: 13/177,894

(22) Filed: Jul. 7, 2011

(65) Prior Publication Data

US 2012/0023990 A1   Feb. 2, 2012

(51) Int. Cl.
| | |
|---|---|
| F24H 4/04 | (2006.01) |
| F24H 9/00 | (2006.01) |
| F24H 9/20 | (2006.01) |
| F24H 1/18 | (2006.01) |
| F28F 9/02 | (2006.01) |

(52) U.S. Cl.
CPC ............... *F24H 4/04* (2013.01); *F24H 1/185* (2013.01); *F24H 9/001* (2013.01); *F24H 9/2007* (2013.01); *F24D 2200/16* (2013.01); *F24D 2200/31* (2013.01); *F28F 9/0246* (2013.01); *Y02B 30/52* (2013.01)

(58) Field of Classification Search
CPC ...... Y02B 30/123; Y02B 30/12; Y02B 30/52; F24F 3/001; F24F 11/0001
USPC .......... 237/50, 55, 19, 13, 2 B; 454/363, 334, 454/69–155, 229, 239, 256
See application file for complete search history.

(56) References Cited

U.S. PATENT DOCUMENTS

| | | | |
|---|---|---|---|
| 4,391,104 A | 7/1983 | Wendschlag | |
| 4,726,824 A * | 2/1988 | Staten | 96/417 |
| 7,478,666 B2 * | 1/2009 | Yamamoto | 165/42 |
| 8,251,785 B2 * | 8/2012 | Schmitt et al. | 454/184 |
| 2006/0071089 A1 * | 4/2006 | Kates | 236/94 |

FOREIGN PATENT DOCUMENTS

| | | | | |
|---|---|---|---|---|
| GB | 1518652 A | | 7/1978 | |
| GB | 2475693 A | * | 11/2009 | ............... F24D 5/12 |
| GB | 2475693 A | | 6/2011 | |
| IE | WO2011004025 | * | 7/2010 | ............... F24F 11/00 |
| WO | 2009026618 A1 | | 3/2009 | |
| WO | 2011004025 A1 | | 1/2011 | |

OTHER PUBLICATIONS

Search Report and Written Opinion from corresponding PCT Application No. PCT/US2012/044789 dated Jul. 17, 2013.

* cited by examiner

*Primary Examiner* — Steven B McAllister
*Assistant Examiner* — Ko-Wei Lin
(74) *Attorney, Agent, or Firm* — Dority & Manning, P.A.

(57) ABSTRACT

A duct adapter system directs air flow relative to a hybrid water heater. The duct adapter system includes a collar adapted to surround a vent of a hybrid water shroud. The collar couples to standard duct pipe to extend ductwork to a heat pump portion of the hybrid water heater. A boost fan may be included in the system for boosting air flow to or from a remote location. The duct adapter system is adapted to deliver a warm air supply to the heat pump from the remote location, or deliver the cool discharge air from the heat pump water heater to a remote location.

7 Claims, 2 Drawing Sheets

HYBRID ELECTRIC WATER HEATER WITH EXTERNAL DISCHARGE DUCTING

BACKGROUND OF THE DISCLOSURE

The present disclosure is directed toward a ducting system for use with a hybrid water heater and more particularly to a ducting arrangement that is joined to the water heater for directing air to and from the water heater to/from different locations to decrease energy consumption of the water heater, and/or of the water heater and building system, as well as provide means to minimize impact on the temperature of the conditioned space adjacent to the water heater if this is desired.

In a hybrid water heater system, a heat pump is mounted to a water storage tank of the water heater. A working fluid or refrigerant circulates through the heat pump to heat water that is stored in the tank. More particularly, the heat pump system generally includes an evaporator, compressor, condenser, throttling device, and a fan. The fan directs warm air over the evaporator for transferring heat to the working fluid. The working fluid exits the evaporator in a fluid state in the form of a superheated vapor and/or a high quality vapor mixture. Upon exiting the evaporator, the fluid enters the compressor where the pressure and temperature increase so that the fluid becomes superheated vapor. The superheated vapor then enters the condenser positioned proximate the water storage tank where the heat energy is transferred to the water within the storage tank. As a result of the heat energy transfer, the working fluid/refrigerant turns into a saturated liquid or high quality liquid vapor mixture which travels through the throttling device, and then to the evaporator where the cycle is repeated.

The heat pump water heater typically operates in a closed area that is contained in a conditioned space. To keep the conditioned space warm, the furnace operates when the temperature of the conditioned space drops below a select setting or set point. If the heat energy from the warm ambient air contained in the conditioned space is transferred by the heat pump water heater to the water stored in the tank, the furnace can run more frequently and/or for longer durations to compensate for the temperature loss. Furthermore, the heat pump can undesirably direct cool air into the conditioned space in the winter. Thus, although cool air may be desired in the summer, it is undesirable to direct the cool air from the heat pump in the winter months into the conditioned space.

Furthermore, the hybrid water heater can consume more energy if it is put into an operating mode that functions to heat the water contained in the tank body using a resistive heater like a standard electric water heater. This creates an inefficient heating arrangement. Additionally, the extra power required to run the furnace can cause the occupant to incur greater utility expenses. Accordingly, an alternative arrangement for receiving air to and/or directing air from the hybrid water heater is desired, and also an arrangement that is responsive to seasonal conditions.

SUMMARY OF THE DISCLOSURE

A first exemplary embodiment of the disclosure is directed toward a duct adapter system for directing air flow relative to a hybrid water heater. The duct adapter system includes a collar having a continuous sidewall defining a channel. The collar includes a first end that is adapted to surround a louvered air vent cover of a hybrid water heater. An opposite, second end is adapted to couple to an associated air duct. The duct adapter system may include a boost fan that is adapted to selectively drive air movement relative to the hybrid water heater.

A second exemplary embodiment of the disclosure is directed toward a duct adapter system for controlling airflow relative to a hybrid water heater system. The duct adapter system includes a duct collar which directs airflow relative to the hybrid water heater. A controller selectively controls the airflow through a select one of multiple diverging openings of the duct collar. A sensor may be operatively associated with the controller. The controller directs the airflow through a select diverging path of the duct collar based on an input received by the sensor. The duct collar couples to associated ductwork to provide an airflow path extending between the hybrid water heater and a remote space not surrounding the hybrid water heater. Alternatively, dampers may be manually operated to define the airflow path between the hybrid water heater and an air source or air discharge area, for example, a warmest available air source (e.g., another room, attic, ambient environment, outside environment, etc.), and/or during the heating season when cool discharge air from the heat pump water heater is undesirable and can be directed outdoors or to an unconditioned space.

A third exemplary embodiment of the disclosure is directed toward a water heating system. The water heating system includes a hybrid water heater having a tank body and a heat pump. A shroud encloses the heat pump. The heating system also includes a duct collar. The duct collar extends outwardly from a louvered vent cover of the shroud. The duct collar is adapted to couple to associated ductwork that extends to a space not surrounding the hybrid water heater. The water heating system may also include a boost fan for moving air between the space and the hybrid water heater.

One advantage of the present disclosure relates to decreasing energy consumption by directing air to and/or from the hybrid water heating system.

Another aspect of the present disclosure is a duct adapter system that operates with a hybrid water heater to decrease energy consumption. A boost fan of the duct adapter system draws warm air from a remote source that is removed from a conditioned space that is surrounding the hybrid water heater and being heated by a furnace or heater. Accordingly, the furnace does not energize to restore a temperature of the conditioned space because ambient heat is no longer absorbed from the space. The decrease in power usage can result in reduced utility costs based on a decrease in power consumption.

Another aspect of the disclosure is a duct adapter system that can maintain a temperature of a conditioned space surrounding the hybrid water heater. More particularly, variable and undesired temperature changes can be prevented by absorbing from an alternative heat source of warm air needed to operate the heat pump and thereby controlling air inlet to the hybrid water heater, and also controlling air outlet from the hybrid water heater. Accordingly, comfort of the occupant is maintained.

DETAILED DESCRIPTION OF THE PREFERRED EMBODIMENTS

Figure 1:
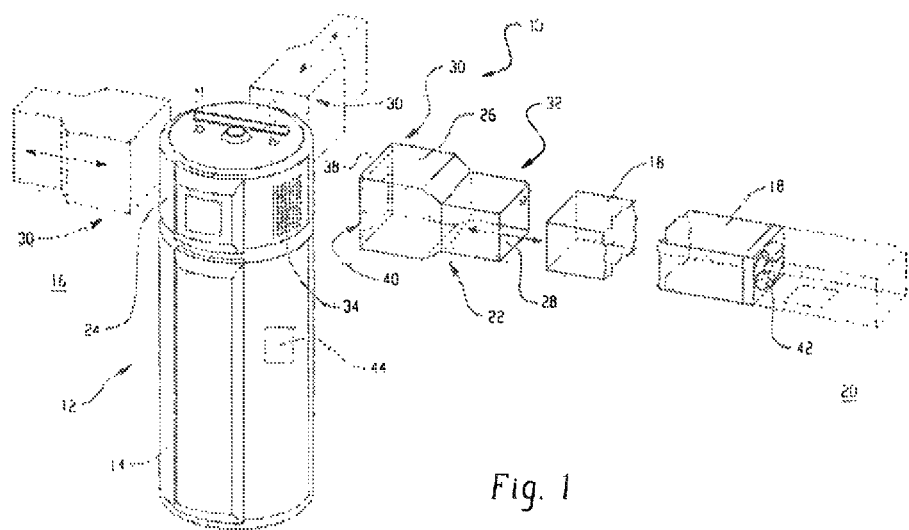
FIG. 1 illustrates an exploded perspective view of a duct adapter system operating in conjunction with a hybrid water heater.

The present disclosure is directed toward a duct system 10 for operating in conjunction with a hybrid water heater 12. The hybrid water heater can include a hybrid electric water heater ("HEWH") incorporating a resistive heater element and a heat pump. FIG. 1 illustrates the HEWH including a stand-alone tank body 14 for storing a volume of water. Cold water is delivered to the tank body 14, where it is heated and stored until it is desirably used. The hybrid water heater 12 can operate in multiple modes. A resistive heater element (not shown) heats the water temperature to a select set point in a first mode. In a second mode, the heat pump selectively energizes to heat and/or maintain the temperature of the volume of water.

The heat pump (not shown) is supported by a top surface of the tank body 14. The heat pump can be mounted to this surface, or it can be positioned in proximity to the tank body 14 as long as a condenser of the heat pump is in direct contact with the water. The condenser transfers heat to the water. In a typical hybrid water heater 12, the heat transfers from the ambient air to the water. Generally, a fan that is operatively associated with an evaporator of the heat pump draws heat from the space surrounding the hybrid water heater 12. Accordingly, the heat pump can absorb heat from a conditioned space 16 if the hybrid water heater 12 is located in proximity to the space.

A conditioned space 16 is referred to herein as a temperature controlled room or space located in a structure. The conditioned space 16 can include the living and working spaces in a structure that are maintained at certain temperatures for providing comfort to an occupant of the space. The hybrid water heater 12 can occupy a conditioned space 16 when it is situated, for example, in a closet, a utility room, or a basement. Generally, these areas are included in temperature controlled regions of the structure. A temperature controlled conditioned space includes an area that is heated and/or cooled to a select temperature using a furnace and/or air conditioner unit. More particularly, the spaces are heated and/or cooled to maintain a programmed temperature. Ductwork extends throughout the structure to deliver air provided by the heating and/or cooling appliance to the conditioned space. Alternatively, an unconditioned space can be referred to as a non-temperature controlled room or space located in or around the same structure. The unconditioned space can include a yard, garage, an attic, or an enclosed patio. As referred to herein, an unconditioned space can also include any remote part of a structure that is not surrounding the hybrid water heater when the water heater is contained in a part of the structure that is temperature controlled.

An aspect of the present disclosure is a duct adapter system 10 that provides an alternative heated (ambient) air supply to the hybrid water heater 12 so that the evaporator of the heat pump does not absorb heat from the conditioned area 16 surrounding the heat pump. The duct adapter system 10 functions to couple the heat pump with ductwork 18 that leads to a remote space 20. In another embodiment, the duct adapter system 10 generally couples the heat pump to ductwork 18 that leads to a contained remote heat source which can provide a warm air supply. The heat source can be a temperature controlled space or a non-conditioned area (e.g., attic, external environment).

With continued reference to FIG. 1, the duct adapter system 10 is shown to include a duct collar 22, for example, that connects to the hybrid water heater. The duct collar 22 is a molded plastic duct adapter unit that can be made to attach to a shroud 24 of the hybrid water heater. In one embodiment, the duct collar 22 can include a continuous sidewall 26 defining a channel 28 having a first end 30 and a second end 32. In another embodiment, the duct collar 22 can be defined as a set of connected sidewalls similarly defining a channel. The channel 28 can provide a path for an air current to travel from a first one of the hybrid water heater and a standard duct 18 to a second one of the water heater 12 and duct 18.

With continued reference to FIG. 1, the first end 30 of the duct collar 22 couples to the hybrid water heater 12. The hybrid water heater can include a molded plastic shroud 24 enclosing the heat pump system. A louvered cover provides an intake vent 34 in the shroud 24 so that the fan can draw the ambient air toward the evaporator. Similarly, the second louvered discharge cover (not shown but preferably spaced from the first vent) can provide a second exhaust vent for the hybrid water heater to exhaust cold air, which is a byproduct of the heating operation. In this manner, the duct collar 22 can operate with the duct 18 to move an air current away from the area surrounding the hybrid water heater. More particularly, the air current is drawn from or exhausted to a remote space (another room, attic, external environment) specifically not surrounding the hybrid water heater. Further, the ducting system can be controlled depending on changing conditions such as being seasonally dependent, e.g. air may be drawn from the attic or externally of the home during the summer to the inlet of the hybrid water heater, or may be directed to or exhausted to the attic or externally of the home during the winter.

It is contemplated, however, that a duct adapter system 10 of the present disclosure can include a shroud 24 component for positioning relative to the heat pump. More particularly, the shroud 24 can be positioned to enclose the heat pump in hybrid water heaters 12 that include an exposed heat pump. The shroud 24 component can include dimensions that are particularly suited for enclosing at least the fan and evaporator. In this particular embodiment, the duct collar 22 can be formed integral to the shroud 24. Accordingly, the duct collar 22 can surround the louvered intake or exhaust vent cover 34 of the shroud. The duct collar 22 can extend outwardly such that an exposed open end (second end 32) can couple to the ductwork 18. Generally, the collar 22 functions as an extension of the duct 18 so that the ductwork 18 can reach the louvered vent cover 34 of the hybrid water heater 12. The duct adapter system 10 illustrated in FIG. 1 shows that an air current can move relative to the hybrid water heater 10 such that air that is input to (or output from) the heat pump is not in communication with the surrounding conditioned area.

Embodiments are contemplated to mold, receive around or matingly fit the ductwork to the shroud, e.g., an interference fit, or fasteners, or may include an adhesive layer 38 formed on the duct collar 22 for coupling the first end 30 of the duct collar 22 to the shroud 24. This adhesive layer 38 can be a tape directed toward reinforcing an attachment of the duct collar 22 to the shroud 24. Accordingly in one embodiment, the adhesive layer 38 is formed along an outer peripheral edge 40 (FIG. 2) of an opening defined by the first end 30. This adhesive layer 38 adheres to an outer surface of the shroud 24. Of course, alternative arrangements for joining the ductwork to the hybrid water heater inlet and outlet can be used without departing from the scope and intent of the present disclosure.

With continued reference to FIG. 1, a boost fan 42 is illustrated as also being included in the duct adapter system 10. The boost fan 42 is adapted for insertion into the standard ductwork 18 at a select remote location 20 in a structure based on a general temperature of the location. A boost fan may be necessary if the fans integral to the heat pump water heater are not sized or intended to manage additional length of duct work attached to the product. The boost fans of the duct system may be sized to provide a net-zero pressure increase through the duct system such that the heat pump water heater fan system is not impacted. The boost fan may be controlled in multiple ways, one being a pressure sensor placed in the duct, that detects a pressure change associated with the start-up of the fans integral to the heat pump water heater. Another manner of controlling the boost fan is by direct communication with the heat pump water heater controller such that when the heat pump water heater fans are running, the boost fan is running.

It is envisioned that a standard vent cover can provide an access to the ductwork 18 in the select remote area 20. The vent cover can be removed to selectively position the boost fan 42 into the standard duct pipe 18. In another embodiment, the boost fan 42 can be incorporated into a weatherproof wall or similar support surface. In yet another embodiment, the boost fan 42 can be incorporated into a roofcap.

The boost fan 42 functions to assist in moving air between the shroud 24 and the remote space 20 particularly because the distance is too great for the fan of the heat pump to effectively do the same. The internal fans of the hybrid water heater 10 are not sized or designed to not have enough power to draw warm air from remote spaces 20. Similarly, the internal fans of the hybrid water heater do not have enough power to push the cold exhausted air through external ducts and weatherproof walls or roof caps. Therefore the duct adapter system 10 can incorporate the boost fan 42 selectively positioned to draw warm air for the evaporator, or to exhaust cool air away from the heated area surrounding the heater 12 and if necessary, to remote locations. Multiple boost fans 42 can be included in the duct adapter system 10. The boost fan can be operatively associated with a hybrid water heater controller unit 44. Internal controls of the hybrid water heater 12 can be updated to desirably drive and/or energize the boost fan.

Figure 2:
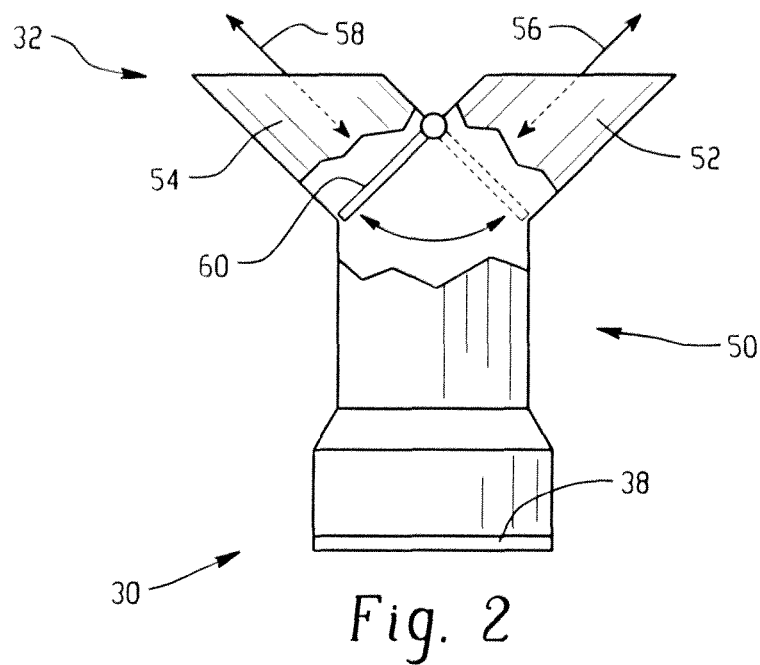
FIG. 2 illustrates an overhead view of a Y-duct collar embodiment.

In a further embodiment illustrated in FIG. 2, a duct collar 50 is shown having multiple diverging portions 52, 54 (including more than two paths) so that air current can be selectively moved between the heat pump and alternate remote spaces 20. FIG. 2 illustrates a duct collar such as Y-shaped duct collar 50 including two separate or diverging paths 56, 58. A first opening of the Y-duct collar 50 surrounds the louvered vent cover 34 of the shroud 24. A second opening of the Y-duct collar 50 can couple to a first (opening) portion of ductwork 18 that extends to communicate with first remote space 20 of the structure. The third opening of the Y-duct collar 50 can couple to a second (opening) portion of the ductwork 18, which extends to a second, different remote space of the structure. The first and second portions 52, 54 can be included on the same duct or different ducts of the ductwork 18.

To control the flow of heated air drawn from (or exhausted to) a select one of the locations, a damper 60 or similarly functioning valve component can be included inside the duct collar 50 at the diverging point. Because the duct collar 50 can be an exposed component when it is coupled to the hybrid water heater 12, the damper 60 can be a mechanical damper in which the operator can access the damper to manually switch the damper from a first position to a second position. The operator can manually set the mechanical damper 60 to a desired position. However, another embodiment is contemplated, in which the damper 60 is operatively associated with a controller that signals an actuator to re-position the damper. The controller can be the hybrid water heater controller unit 44 included with the hybrid water heater 12. Alternatively, the controller can be associated with a thermostat 78 (FIG. 3) used to maintain temperature in the structure. The controller 44 or 78 can selectively send a control signal to move the damper 60 between the first position, which generally closes a first one of the diverging paths and opens a second one of the diverging paths 56, 58, and a second position, which generally opens the first one of the diverging paths and closes the second one of the diverging paths 56, 58.

Figure 3:
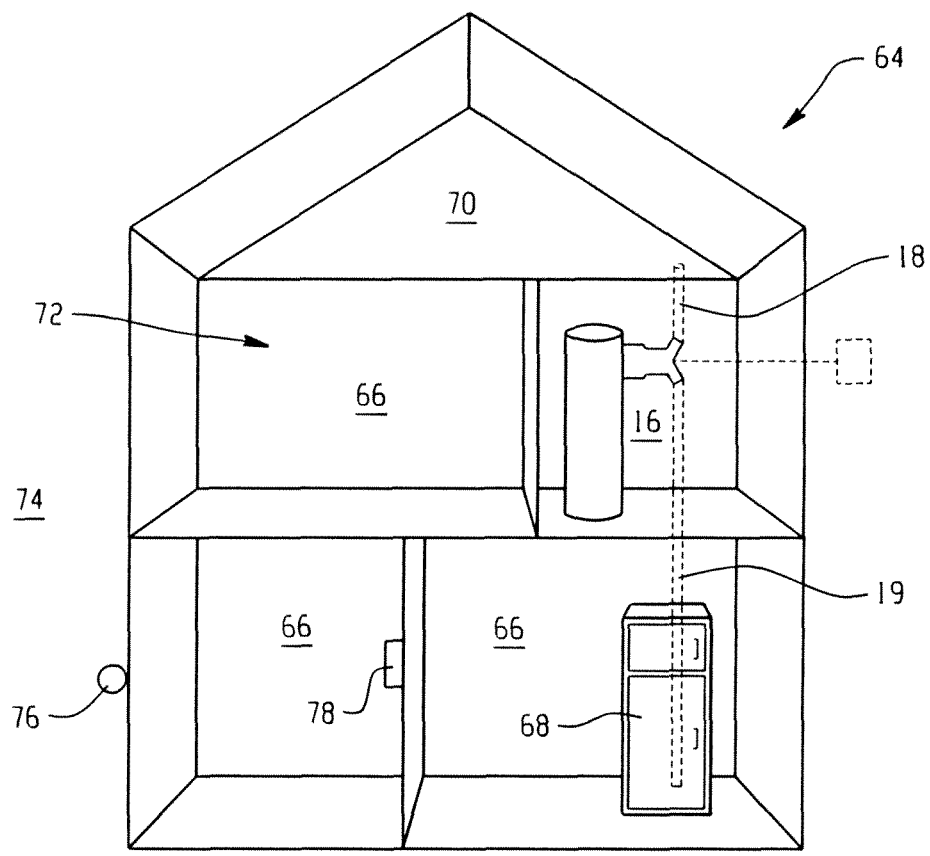
FIG. 3 illustrates a cross-sectional side view of a structure including the duct adapter system operating in conditioned and remote spaces.

FIG. 3 illustrates an example of the duct adapter assembly 10 incorporated in a structure having multiple rooms. In one example, it is contemplated that the first diverging path 56 of the Y-duct collar 50 couples to ductwork 18 that leads to a heat source corresponding to an appliance 68. More particularly, an embodiment is contemplated in which the heated air current exhausted from a working appliance 68, such as, for example, a refrigerator, can be drawn by the boost fan 42 for the heat pump to use as a warm air supply. The second divergent path 58, for example, can lead to a remote space 20, such as, an attic 70, or to any space having warm air contained in a generally closed environment.

In another embodiment, the hybrid water heater 12 can also be ducted 64 using the duct adapter system 10, in a manner that provides ducting of warm air drawn from inside or outside the home or structure 64. The first divergent path 56 of the duct collar 50 can couple to a first duct 18 that leads to an indoor air supply 72 and the second divergent path 58 can couple to a second duct 19 that leads to an outdoor air supply 74. The previously mentioned damper can be incorporated in the collar or diverging portions of the ductwork 18, 19 to enable a selection for the indoor or outdoor air supply. This embodiment can be useful for structures situated in regions having variable climates. For example, warm air can be drawn from a conditioned area inside the structure 64 (but removed from the area 20 surrounding the hybrid electric heater) in winter. In summer, warm air can be drawn from a region outside 74 of the structure 64. Including a path that leads to other locations in the home or to the external environment (FIG. 3) to either draw air from, or direct air to such remote locations, provides greater options and versatility to the system so that the most preferred air temperatures to input to the hybrid water heater and exhaust from the hybrid water heater are used in order to decrease energy consumption.

The controller can selectively determine which of the multiple ductwork paths 56, 58 can be used for moving air based upon input that is received, for example, by a sensor. The sensor is operatively associated with the controller. A first sensor embodiment, for example, can include a remotely positioned outdoor temperature sensor 76. For example, the temperature sensor 76 can include a thermistor 76 that can transmit an outdoor temperature signal to the hybrid water heater control unit 44. The hybrid water heater control unit 44 can direct the damper 60 to move to one of multiple positions based on the signal received by the outdoor temperature sensor 76.

Similarly, in a second embodiment, the sensor can be operatively associated with a (HVAC) home thermostat 78. The damper 60 position can be determined based on a mode of operation of the home thermostat 78 system. For example, the home thermostat 78 can operate in heating and cooling modes. The damper 60 position can move to direct airflow from the remote region 20 of the structure 64 that tends to have an air supply at a generally known temperature during certain modes of operation.

In yet another embodiment, the duct collar 22 as illustrated in FIG. 1 can include an integral airflow sensor 80 or switch that can send a signal when the hybrid water heater 12 is blowing cold air. For example, one type of sensor that can monitor on/off operation of the heat pump is a pressure sensor that monitors and detects when the heat pump water heater fan is on/off.

It would also be advantageous to determine when to turn boost fan(s) on/off. One manner of accomplishing this is to use a pressure sensor/switch that detects pressure change in duct system when integral fans in the hybrid water heater system turn on/off. An alternative manner is to communicate directly with the hybrid water heater system control such that boost fans run when the hybrid water heater system fans run.

It would also be advantageous to determine a desired flowpath to and from the hybrid water heater system. This can be done with sensors that monitor temperature for remote locations where air is drawn from and directed to. Alternatively, the arrangement can be integrated to a HVAC themostat control for the home such that duct system dampers of the hybrid water heater system move based on heating or cooling function of the home HVAC system. It is also contemplated that these features of the temperature sensors and operatively integrating with the HVAC thermostat can be used in combination.

The airflow sensor 80 can be positioned inside the channel 28 defined by the wall(s) 26 forming the duct collar 22. The airflow sensor 80 can operate to send the signal based on a general temperature of the air current. The hybrid water heater controller unit 44 can energize the boost fan 42 based on a temperature of the air current to control the volume of air drawn into (or exhausted through) the ductwork 18. In one embodiment, the hybrid water heater controller unit 44 energizes and de-energizes the boost fan 42 based on the signal transmitted from an integral airflow sensor positioned in the collar 22 that is integral to the shroud 24. Of course, other sensor arrangements can be used to provide data to the controller regarding operation of the heat pump water heater, and/or to provide data regarding the temperature of remote locations from which air can be drawn or exhausted.

The present disclosure is not limiting, and embodiments of the duct adapter assembly are contemplated to include a set of two collars formed on the shroud, wherein a first collar 22 surrounds the intake louver vent cover 34 and a second collar surrounds the exhaust louver vent cover. Additionally, there is no limitation made to a number of boost fans that can be incorporated into ductwork and remote regions for assisting in air movement relative to the heat pump. The system will be designed to be sensitive to the impact of adding a boost fan or how the boost fan may operate. There will be a need to monitor the on and off condition of the hybrid water heater, sense the temperature of select remote locations, alter the damper positions, etc., so that the path of air flow may be changed. Likewise, if a ductwork kit is offered for connection to the hybrid water heater, options can be provided to connect to the heat pump water heater inlet only, exhaust only, or both the inlet and exhaust The disclosure has been described with reference to the preferred embodiments. Obviously, modifications and alterations will occur to others upon reading and understanding the preceding detailed description. It is intended that the invention be construed as including all such modifications and alterations.

What is claimed is:

1. A water heating system comprising:
a hybrid water heater including a tank body and a heat pump, the heat pump being located in a conditioned space proximate the tank body and receiving warm air from a first remote location and exhausting air cooled by the heat pump into a second remote location;
a shroud configured to enclose the heat pump;
ductwork extending from the hybrid water heater to the first and second remote locations spaced from the hybrid water heater;
a collar surrounding and extending outwardly from a vent of the shroud, the collar being configured to couple to the ductwork;
a boost fan; and
an airflow sensor configured to detect whether the heat pump is in operation,
wherein the boost fan is energized to move air through the ductwork between the heat pump and the first and second remote locations in response to the airflow sensor's detection that the heat pump is in operation, and
wherein the boost fan is sized so that once energized the boost fan provides a net-zero pressure increase through the ductwork at the heat pump so that a fan of the heat pump is not impacted.

2. The water heating system of claim 1, wherein the boost fan is configured to move air from the first and second remote locations to the heat pump.

3. The water heating system of claim 1, wherein a desired flowpath to and from the hybrid water heater is selected by using sensors that monitor temperature for the first and second remote locations where air is drawn from and directed to, or operatively integrating the hybrid water heater with a HVAC thermostat control.

4. The water heating system of claim 1, wherein the airflow sensor comprises a pressure sensor configured to detect a pressure change associated with an operation of the heat pump.

5. The water heating system of claim 4, wherein the operation of the heat pump comprises an operation of the fan of the heat pump.

6. The water heating system of claim 1, wherein the airflow sensor is disposed in the collar.

7. The water heating system of claim 1, wherein the airflow sensor is disposed in the associated ductwork.

\* \* \* \* \*